July 31, 1945.    M. MORRISON    2,380,668
ARC-WELDING CONVERTER
Filed Dec. 23, 1943
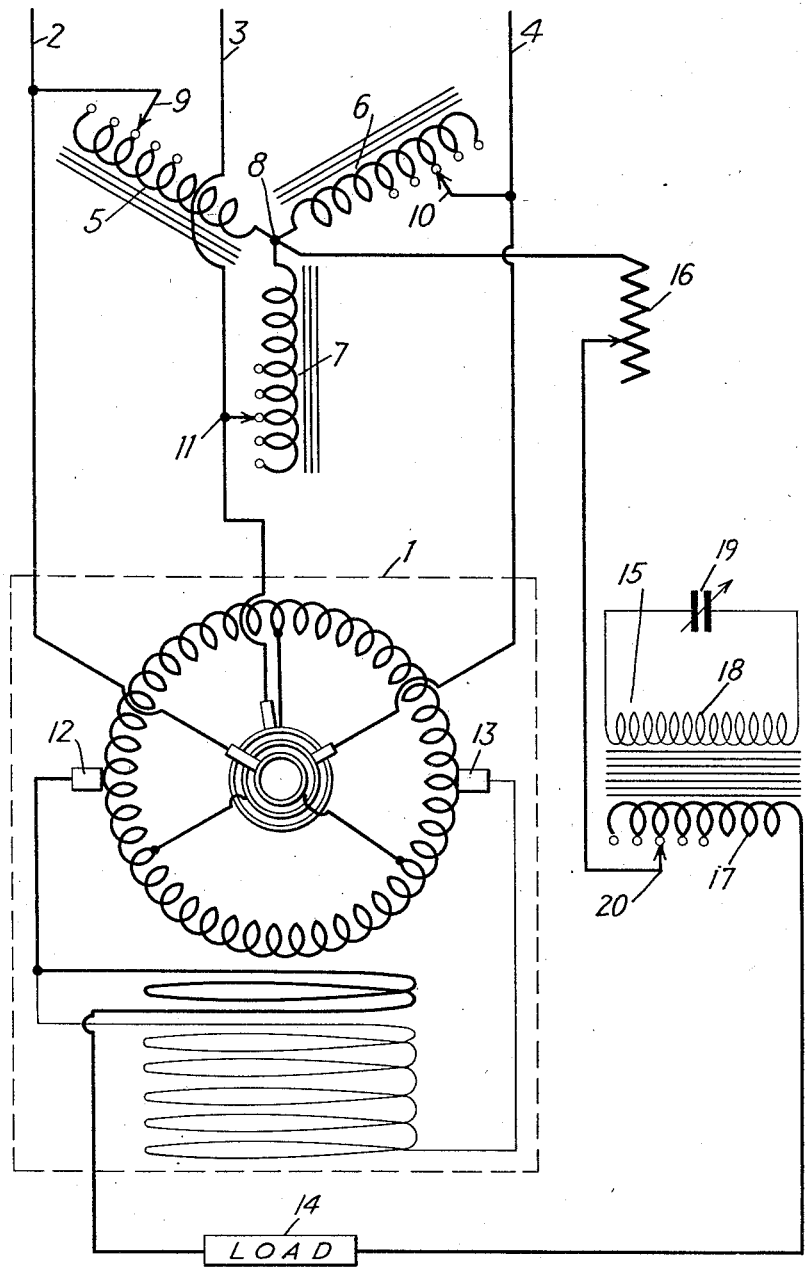
INVENTOR.
Mountford Morrison Patented July 31, 1945

2,380,668

UNITED STATES PATENT OFFICE 2,380,668

ARC-WELDING CONVERTER

Montford Morrison, Upper Montclair, N. J.

Application December 23, 1943, Serial No. 515,458

4 Claims. (Cl. 171—123)

The present invention relates to synchronous converters. It relates in particular to the operation of such converters through a neutral connection, and relates specifically to such machines when used in direct current arc-welding circuits.

Among the objects of the invention are: to provide, from an alternating current supply circuit, a source of direct current for arc welding having a higher apparatus efficiency than an equivalent motor-generator set; to provide a converter suitable for arc welding having a higher electrical efficiency than an equivalent motor-generator set; and to provide a converter device for such application having a basically lower manufacturing cost than an equivalent arc-welding motor-generator set.

In the prior art rotating dynamo electric machines for use in producing direct currents for arc welding application, motor-generator sets have been resorted to, the generator being a direct current machine with a differentially compounded field. The reason for the choice of such a set was to obtain a generator with drooping voltage characteristics combined with such current limiting characteristics as are conducive to the production of a stable arc for welding purposes.

These motor-generator sets have a very low overall apparatus efficiency because they require three machines to accomplish the results sought after. If the full load rating of the direct current generator is taken as having an apparatus efficiency of one, then the addition of the driving motor, which must be of approximately the same machine size, reduces this apparatus efficiency to 50%. The fact that the generator does not operate at full voltage but at a minor fraction of full voltage, reduces the machine efficiency to a minor fraction of 50% and the addition of the exciter still further reduces this value, so that the overall apparatus efficiency is something of the magnitude of 20% of the unity value chosen above, reckoned from the full voltage full load rating of the direct current generator.

The electrical efficiency of such a three-machine set is, of course, the direct current machine efficiency multiplied by the alternating current machine efficiency, taking into account the losses in the exciter which brings the electrical efficiency down to a value lying within the range of between 50 and 60%.

Standard synchronous converter devices and circuits have not been applied to arc welding because synchronous converters require the direct current voltage across the brushes to be maintained substantially constant in value or at least substantially constant with reference to a given polar field strength.

Synchronous converters have a high apparatus efficiency, a three-ring machine having an apparatus efficiency of about 166% of direct current machine rating and a six-ring converter having an apparatus efficiency of nearly 200% of that of the direct current machine rating.

Where transformer devices are employed in connection with synchronous converters, the electrical efficiencies of the order of 97% are commonly attained.

The present invention provides circuits, means and methods of employing these desirable qualities of synchronous converter devices for the generation of suitable direct currents for welding circuits.

In the present invention the employment of the synchronous converter is made possible by an improvement which allows the armature voltage across the direct current brushes to remain substantially constant and at the same time provide drooping voltage characteristics in the load circuit making them suitable to arc welding application.

I have discovered that by the employment of my improved circuits in conjunction with synchronous converters, I can draw extremely heavy loads from the machine for arc welding purposes with drooping voltage characteristics without disturbing substantially the synchronous speed-voltage of the machine.

These and other features will be pointed out and obvious in the reading of the description hereunder, particularly when taken in connection with the drawing which shows a diagrammatic representation of my invention.

The dotted area 1 encloses the diagrammatic representation of a compound wound three-ring synchronous converter which may be of a more or less standard design, though special features such as particularly stiff fields, wide commutating zones, heavy damper windings and other desirable features, may be incorporated into its design.

The synchronous converter in area 1 is a broadly polyphase machine and may have any suitable number of rings and may be operated upon any suitable number of phases, but in the teaching of this invention, the description will be limited to a three-ring, three-phase machine in order to avoid confusion and complicity in the instructions relating to making and using the invention.

Also the synchronous converter illustrated in the area 1 may have a single winding, as shown in the diagram. The winding or windings may be so arranged that the flux turns, caused by load current from a single brush to a connection in the alternating current side of the machine, are distributed equally under all poles. In this way the armature reaction due to current between the connection 8 and the brush 12 is equalized under the poles in such a way that the armature reaction is in effect equivalent to current between brushes 12 and 13, if and when so used. This particular armature winding method is not essential in all cases but is conducive to magnetic balance in the armature and to the reduction of commutation problems at the direct current brushes.

Leads 2, 3 and 4 represent a three-phase supply circuit, and reactors 5, 6 and 7 are connected in a star across the three-phase supply circuit and have the common center tapped 8. Each reactor is provided with taps, as shown in the diagram, which provides means in each reactor for increasing the volts per turn thereof, which in turn, increases the magnetic density in the iron-cores of these reactors with any fixed line voltage. The magnetic density in the cores of these reactors controls the amplitude of the third harmonic produced in the exciting current thereof. This star-connected group of reactors operates in the same manner as a star-connected set of transformer primaries when the secondaries thereof remain open. As is well known in the art, the voltage at the connection 8 does not remain at the true neutral position of the system, but alternates at a triple frequency, the amplitude of which is governed by the degree of magnetic saturation of the cores of the reactors. Between the connection 8 and any true neutral voltage position in the system, there is generated a third harmonic voltage, the amplitude of which may be controlled by the adjustment of arms 9, 10 and 11.

The rotary converter enclosed in area 1 has a true neutral position and that is represented by a voltage value half way between brushes 12 and 13. Synchronous converter 1 is loaded through a single brush 12 to a load 14 which includes an alternating current reactive device 15 and a variable resistor 16.

Between the connection 8 and through one brush of machine 1 and in the drawing brush 12, there may be generated a high amplitude third harmonic which is superimposed upon half the direct voltage of the machine, the direct voltage of the machine being half the voltage between the two brushes 12 and 13. Superimposed upon this half voltage is the third harmonic previously referred to, whose amplitude may be adjusted by means of arms 9, 10 and 11 to values from that approaching zero to approximately half machine voltage which provides a high open circuit voltage for starting the arc, and with the proper reactance control of 15, the amplitude control of this harmonic can be fixed at any desired full load value within the rating of the machine.

The alternating current reactive device 15 may be any suitable device which is responsive to a third harmonic in the control thereof but in the case illustrated, it is represented as being a step-up transformer having a low voltage primary 17 and a high voltage secondary 18, shunted by a variable condenser 19, with means to vary the primary turns of the reactor by an arm 20.

In the absence of any substantial condenser load by condenser 19, the alternating current reactive device 15 becomes, in effect, an inductive reactance. With the very close coupling between coils 17 and 18, the effect of the condenser 19 may be made to produce a condensive reactive effect in the primary circuit 17 and thus the alternating current reactive device 15 becomes a series inductive reactive device or a series capacitive reactive device or some combination of the two and always in series with a load.

Thus by the proper adjustment of the voltage taps 9, 10 and 11, a suitable maximum open circuit voltage for the load 14 may be obtained, and by a suitable adjustment of alternating current reactive device 15 and resistor 16, a stable operating load current and voltage is obtained for the particular job of welding under operation.

With such a neutral loading circuit the voltage, between brushes 12 and 13, is affected but little and overloads of 200% in the neutral circuit are practical without disturbing the synchronous speed voltages sufficient to cause it to hunt out of step.

The term "neutral" as used herein is hereby defined to include all "eccentric," "wabbling" and other "neutral" connections and is specifically used to include any connection made to the physical center connection of any polyphase network.

Having described one embodiment of my invention, the scope thereof is covered in the claims hereunder.

What I claim is:

1. In a dynamoelectric device, a polyphase synchronous converter connected to a polyphase supply circuit, said circuit being shunted by a star-connected group of iron-core reactors providing a pronounced higher harmonic of voltage difference between the center connection of said star-connected reactors and the neutral voltage point of said converter, said neutral voltage point being the mid-value voltage present between commutator brushes of opposite polarity of said converter, a direct current load connected between said connection and one commutator brush of said converter, and said load connection including an alternating current circuit element selectively reactive to said higher harmonic.

2. In a dynamoelectric device, a three-phase synchronous converter connected to a three-phase supply circuit, said circuit being shunted by a star-connected group of iron-core reactors providing a pronounced third harmonic of voltage difference between the center connection of said star-connected reactors and the neutral voltage point of said converter, said neutral voltage point being the mid-value voltage present between commutator brushes of opposite polarity of said converter, a direct current load connected between said connection and one commutator brush of said converter, and said load connection including an alternating current circuit element selectively reactive to said third harmonic.

3. In a dynamoelectric device, a polyphase synchronous converter connected to a polyphase supply circuit, said circuit being shunted by a polyphase group of iron-core reactors having a common connection, said connection having a voltage which rotates in value with respect to the several said reactors providing an eccentric voltage rotation between said connection and said circuit, a direct current load connected between said connection and one commutator brush of said converter, and the circuit of said load including an alternating current circuit element selectively reactive to said eccentric voltage.

4. In a synchronous converter adapted to opperate under load supplied by voltage developed between one commutator brush and a voltage position intermediate between said brush and a brush of opposite polarity, said position being determined by a transformer device in the alternating current supply circuit, a load connected between said voltage position in said transformer device and one commutator brush of said converter, and an armature winding comprising an equal number of flux-turns connected to said load under all poles of said converter.

MONTFORD MORRISON.